(12) United States Patent
Dwan et al.

(10) Patent No.: US 12,105,686 B2
(45) Date of Patent: *Oct. 1, 2024

(54) CONTENT ITEM PURGING

(71) Applicant: Dropbox, Inc., San Francisco, CA (US)

(72) Inventors: Michael Dwan, San Francisco, CA (US); Anthony Grue, San Francisco, CA (US); Daniel Kluesing, Menlo Park, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,207

(22) Filed: Aug. 11, 2022

(65) Prior Publication Data
US 2022/0382726 A1 Dec. 1, 2022

Related U.S. Application Data

(63) Continuation of application No. 16/569,830, filed on Sep. 13, 2019, now Pat. No. 11,422,990, which is a continuation of application No. 15/261,498, filed on Sep. 9, 2016, now Pat. No. 10,503,711, which is a
(Continued)

(51) Int. Cl.
| | | |
|---|---|---|
| *G06F 7/00* | (2006.01) | |
| *G06F 16/16* | (2019.01) | |
| *G06F 16/215* | (2019.01) | |
| *G06F 16/27* | (2019.01) | |
| *G06F 17/00* | (2019.01) | |

(52) U.S. Cl.
CPC ......... *G06F 16/215* (2019.01); *G06F 16/162* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 4,973,086 | A | 11/1990 | Donnelly et al. |
| 5,216,592 | A | 6/1993 | Mann et al. |
| 5,235,415 | A | 8/1993 | Bonicel et al. |

(Continued)

FOREIGN PATENT DOCUMENTS

| | | |
|---|---|---|
| EP | 2824895 A1 | 1/2015 |
| WO | 0063801 A1 | 10/2000 |

OTHER PUBLICATIONS

Advisory Action for U.S. Appl. No. 14/085,760 mailed on Aug. 27, 2014, 3 pages.
(Continued)

*Primary Examiner* — Tuan A Pham
(74) *Attorney, Agent, or Firm* — Polsinelli PC

(57) ABSTRACT

Methods, systems, and computer readable media for content item purging are provided. A contact item purger, such as may be incorporated within a local client application of a content management system running on a user device, may leverage knowledge as to which items have been uploaded to the content management system, and how long such content items have been stored on the user device, to propose items for deletion from the user device so as to reclaim storage space. A contact item purger may run on one or more user devices, and may activate upon various triggering events, based on various conditions and parameters, with or without user interaction, thus maintaining available memory capacity at all times.

18 Claims, 9 Drawing Sheets

Related U.S. Application Data continuation of application No. 14/077,953, filed on Nov. 12, 2013, now Pat. No. 9,442,944.

(56) References Cited

U.S. PATENT DOCUMENTS

| | | |
|---|---|---|
| 5,251,294 A | 10/1993 | Abelow |
| 5,307,266 A | 4/1994 | Hayashi et al. |
| 5,412,566 A | 5/1995 | Sawa et al. |
| 5,418,713 A | 5/1995 | Allen et al. |
| 5,483,466 A | 1/1996 | Kawahara et al. |
| 5,513,356 A | 4/1996 | Takahashi et al. |
| 5,541,394 A | 7/1996 | Kouchi et al. |
| 5,575,573 A | 11/1996 | Ito et al. |
| 5,666,585 A | 9/1997 | Nagira et al. |
| 5,752,021 A | 5/1998 | Nakatsuyama et al. |
| 5,787,413 A | 7/1998 | Kauffman et al. |
| 5,787,446 A | 7/1998 | Dang et al. |
| 5,794,217 A | 8/1998 | Allen et al. |
| 5,842,213 A | 11/1998 | Odom et al. |
| 5,870,716 A | 2/1999 | Sugiyama et al. |
| 5,873,086 A | 2/1999 | Fujii et al. |
| 5,896,358 A | 4/1999 | Endoh et al. |
| 5,905,981 A | 5/1999 | Lawler et al. |
| 5,935,243 A | 8/1999 | Hasebe et al. |
| 6,021,415 A | 2/2000 | Cannon et al. |
| 6,049,777 A | 4/2000 | Sheena et al. |
| 6,269,382 B1 | 7/2001 | Cabrera et al. |
| 6,330,568 B1 | 12/2001 | Boothby et al. |
| 6,373,989 B1 | 4/2002 | Fukuhara et al. |
| 6,442,570 B1 | 8/2002 | Wu et al. |
| 7,044,365 B2 | 5/2006 | Witherspoon et al. |
| 7,054,887 B2 | 5/2006 | Kozina |
| 7,117,519 B1 | 10/2006 | Anderson et al. |
| 7,171,480 B2 | 1/2007 | Chatani et al. |
| 7,287,088 B1 | 10/2007 | Anderson et al. |
| 7,343,568 B2 | 3/2008 | Jiang et al. |
| 7,386,476 B1 | 6/2008 | Shavanadan et al. |
| 7,426,533 B2 | 9/2008 | Malone et al. |
| 7,444,588 B2 | 10/2008 | Hill et al. |
| 7,519,671 B2 | 4/2009 | Ho et al. |
| 7,523,132 B2 | 4/2009 | Altounian et al. |
| 7,584,225 B2 | 9/2009 | Jiang et al. |
| 7,587,446 B1 | 9/2009 | Onyon et al. |
| 7,698,516 B2 | 4/2010 | Todd et al. |
| 7,751,628 B1 * | 7/2010 | Reisman ........ H04N 21/440227 382/232 |
| 7,865,497 B1 | 1/2011 | Pillai |
| 7,917,417 B2 | 3/2011 | Dion et al. |
| 7,958,196 B2 | 6/2011 | Malone et al. |
| 7,996,172 B2 | 8/2011 | Bauer et al. |
| 8,005,874 B2 | 8/2011 | Altounian et al. |
| 8,032,113 B2 | 10/2011 | Bailey et al. |
| 8,065,385 B2 | 11/2011 | Altounian et al. |
| 8,121,902 B1 | 2/2012 | Desjardins et al. |
| 8,255,545 B1 | 8/2012 | Schmidt et al. |
| 8,261,205 B2 | 9/2012 | Lee et al. |
| 8,504,524 B1 | 8/2013 | Chatterjee et al. |
| 8,943,027 B1 | 1/2015 | Dwan et al. |
| 9,158,706 B2 | 10/2015 | Benhase et al. |
| 9,558,111 B1 | 1/2017 | Balcha et al. |
| 10,042,556 B2 | 8/2018 | Hasegawa et al. |
| 10,264,064 B1 | 4/2019 | Dantkale et al. |
| 10,503,711 B2 | 12/2019 | Dwan et al. |
| 2002/0174200 A1 | 11/2002 | Kozina et al. |
| 2003/0033254 A1 | 2/2003 | Tanaka et al. |
| 2004/0039887 A1 * | 2/2004 | Gautney ............ H04L 67/125 711/159 |
| 2005/0055492 A1 * | 3/2005 | Muthulingam ....... G06F 3/0608 711/100 |
| 2006/0182481 A1 | 8/2006 | Sugahara et al. |
| 2007/0011137 A1 | 1/2007 | Kodama et al. |
| 2007/0050430 A1 | 3/2007 | Meller et al. |
| 2007/0055743 A1 * | 3/2007 | Pirtle ................... H04L 67/568 709/217 |
| 2007/0083571 A1 | 4/2007 | Meller et al. |
| 2007/0091836 A1 | 4/2007 | Oprescu-Surcobe et al. |
| 2007/0120959 A1 | 5/2007 | Wu et al. |
| 2008/0250024 A1 | 10/2008 | Kvm et al. |
| 2008/0311961 A1 | 12/2008 | Cotevino et al. |
| 2009/0171990 A1 | 7/2009 | Naef, III et al. |
| 2009/0254966 A1 | 10/2009 | Josephs et al. |
| 2010/0042801 A1 | 2/2010 | Lee et al. |
| 2010/0070448 A1 | 3/2010 | Omoigui |
| 2010/0306175 A1 | 12/2010 | Johnson et al. |
| 2011/0029435 A1 | 2/2011 | Ronen et al. |
| 2011/0089229 A1 * | 4/2011 | Shenfield ............ H04L 67/535 235/375 |
| 2011/0258333 A1 | 10/2011 | Pomerantz et al. |
| 2011/0302195 A1 | 12/2011 | Cai et al. |
| 2012/0005041 A1 | 1/2012 | Mehta et al. |
| 2012/0005307 A1 | 1/2012 | Das et al. |
| 2012/0047108 A1 | 2/2012 | Mandel et al. |
| 2012/0117406 A1 | 5/2012 | Eun et al. |
| 2012/0131125 A1 | 5/2012 | Seidel et al. |
| 2012/0136727 A1 | 5/2012 | Guioguio, Jr. et al. |
| 2012/0143833 A1 | 6/2012 | Ganesh et al. |
| 2012/0191716 A1 | 7/2012 | Omoigui et al. |
| 2012/0215878 A1 | 8/2012 | Kidron et al. |
| 2012/0216296 A1 | 8/2012 | Kidron et al. |
| 2012/0221382 A1 | 8/2012 | Kidron et al. |
| 2012/0221559 A1 | 8/2012 | Kidron et al. |
| 2012/0221951 A1 | 8/2012 | Kidron et al. |
| 2012/0222050 A1 | 8/2012 | Kidron et al. |
| 2012/0222125 A1 | 8/2012 | Kidron et al. |
| 2012/0222133 A1 * | 8/2012 | Kidron ................. H04L 51/52 726/28 |
| 2012/0249808 A1 | 10/2012 | Hirota et al. |
| 2012/0254340 A1 | 10/2012 | Velummylum et al. |
| 2013/0115981 A1 | 5/2013 | Toksvig et al. |
| 2013/0205114 A1 * | 8/2013 | Badam ................. G06F 9/52 711/207 |
| 2013/0210493 A1 * | 8/2013 | Tal .................... H04L 67/10 455/566 |
| 2013/0311742 A1 | 11/2013 | Ding et al. |
| 2015/0006475 A1 | 1/2015 | Guo et al. |
| 2015/0134624 A1 | 5/2015 | Dwan et al. |
| 2016/0378797 A1 | 12/2016 | Dwan et al. |
| 2017/0153822 A1 | 6/2017 | Xu et al. |
| 2021/0124496 A1 | 4/2021 | Song et al. |

OTHER PUBLICATIONS

Final Office Action for U.S. Appl. No. 14/085,760 mailed on Jun. 13, 2014, 25 pages.

Final Office Action from U.S. Appl. No. 16/569,830, mailed May 2, 2022, 23 pages.

Non-Final Office Action from U.S. Appl. No. 16/569,830, mailed Sep. 2, 2021, 22 pages.

Notice of Allowance for U.S. Appl. No. 14/085,760 mailed on Sep. 22, 2014, 12 pages.

Notice of Allowance from U.S. Appl. No. 16/569,830, mailed Jun. 20, 2022, 9 pages.

Office Action for U.S. Appl. No. 14/085,760 mailed on Jan. 30, 2014, 16 pages.

Wu C., et al., "Point of Capture Archiving and Editing of Personal Experiences from a Mobile Device", Personal and Ubiquitous Computing, Apr. 2007, 50 pages.

Zhang F., et al., "Sharing solutions between Java content repository and database" Proceedings of the 2009 WRI World Congress on Software Engineering, May 2009, pp. 472-475.

* cited by examiner

Fig. 2

Camera Roll Housekeeping

We found 55 photos and 3 Videos that were already uploaded to [*ServiceSystem*]

Would you like to delete these Files from your device and free 185MB of space?

| No Thanks | Delete |

Fig. 3

Camera Roll Housekeeping

We found 55 photos and 3 Videos that were already uploaded to [*ServiceSystem*]

Would you like to delete these Files from your device and free 185MB of space?

| Not Now | Yes |

Fig. 4

55 photos and 3 videos

Do you want to delete?

Cancel   Delete

Fig. 5

55 photos and 3 videos

Do you want to delete?

2 of the photos you're about to delete are no longer in your [*CMS Datastore*]. Ensure you no longer need them before proceeding.

Cancel   Delete

CONTENT ITEM PURGING

CROSS-REFERENCE TO RELATED APPLICATIONS

This application is a continuation of U.S. application Ser. No. 16/569,830, filed Sep. 13, 2019, now U.S. Pat. No. 11,422,990 which is a continuation of U.S. patent application Ser. No. 15/261,498, filed Sep. 9, 2016, now U.S. Pat. No. 10,503,711, which is a continuation of U.S. patent application Ser. No. 14/077,953, filed Nov. 12, 2013, now U.S. Pat. No. 9,442,944 issued Sep. 13, 2016, the entire contents of both of which is hereby incorporated by reference for all purposes as if fully set forth herein. The Applicant hereby rescinds any disclaimer of claim scope in the parent applications or the prosecution histories thereof and advises the USPTO that the claims in this application may be broader than any claim in the parent applications.

This application is related to U.S. patent application Ser. No. 14/085,760, filed on Nov. 20, 2013, now U.S. Pat. No. 8,943,027 issued Jan. 27, 2015, the entire contents of which is hereby incorporated by reference for all purposes as if fully set forth herein.

TECHNICAL FIELD

Some embodiments of the present invention relate to content item purging.

BACKGROUND

Users of various Internet accessible data storage and management services, such as, for example, content management systems, often upload large numbers of content items from various user devices to a data store on such a system. For example, users of various content management systems may take photographs with a smartphone or similar device, and then upload them from their device to one or more accounts on one or more content management systems. Or, similarly, users may acquire various audio files on a device (e.g., by recording with the device, or saving from an email) and subsequently upload them to a content management system. If this is done often, the user may soon realize that his or her memory capacity on the user device is at or very near full capacity. In such an event, a user must delete some content. Content that she has already placed in a remote data store may be the best items to locally delete. But the user does not remember such details.

Embodiment of the present invention address these and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-known, routine, or conventional, merely by virtue of their inclusion in this section.

BRIEF DESCRIPTION OF THE DRAWINGS

In the drawings:

FIGS. 2-6 depict exemplary user interfaces for a content item purging functionality in accordance with some embodiments of the invention;

DETAILED DESCRIPTION

Figure 1:
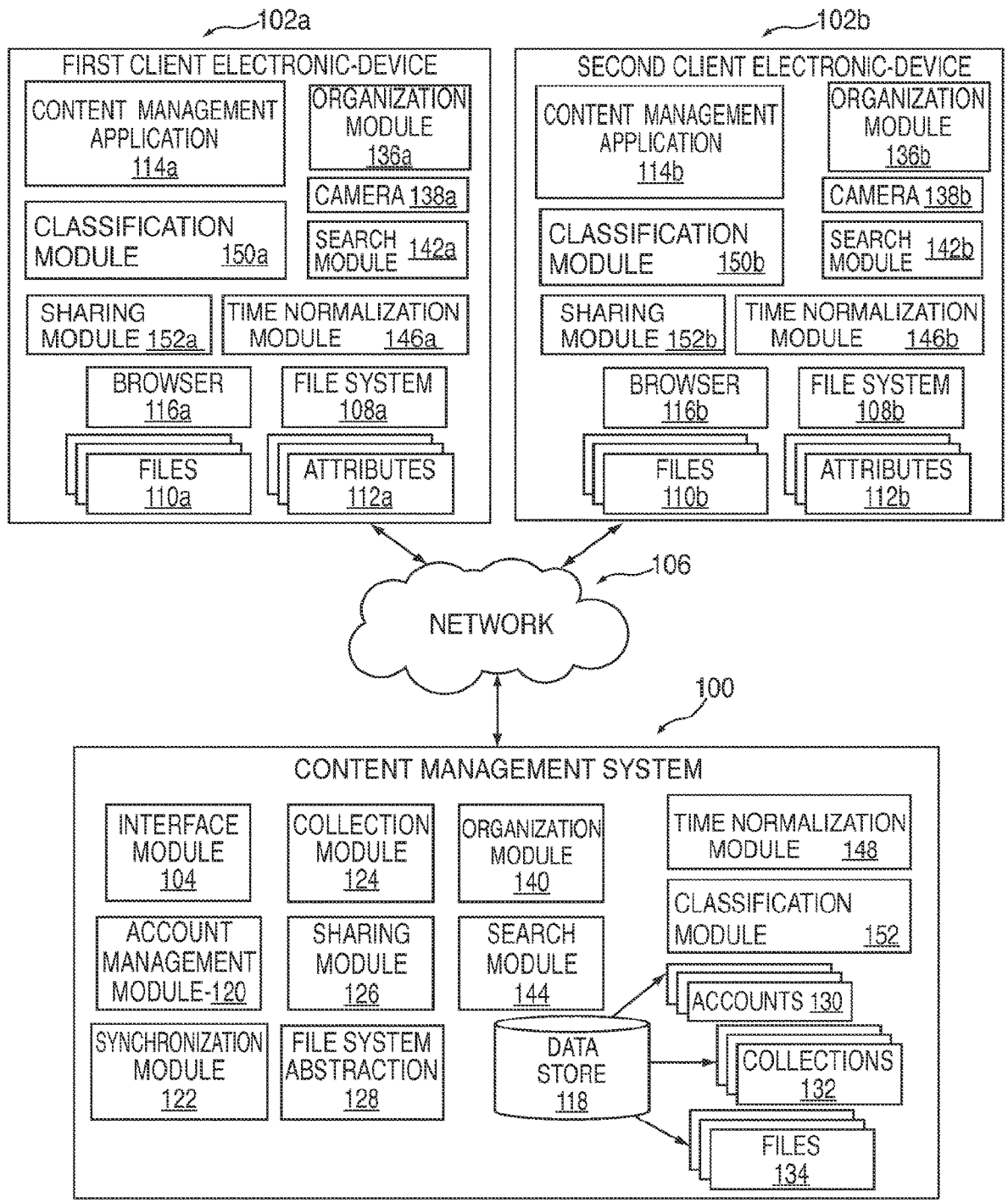
FIG. 1 is an exemplary system in which content purge functionality may be provided in accordance with some embodiments of the invention.
Figure 6:
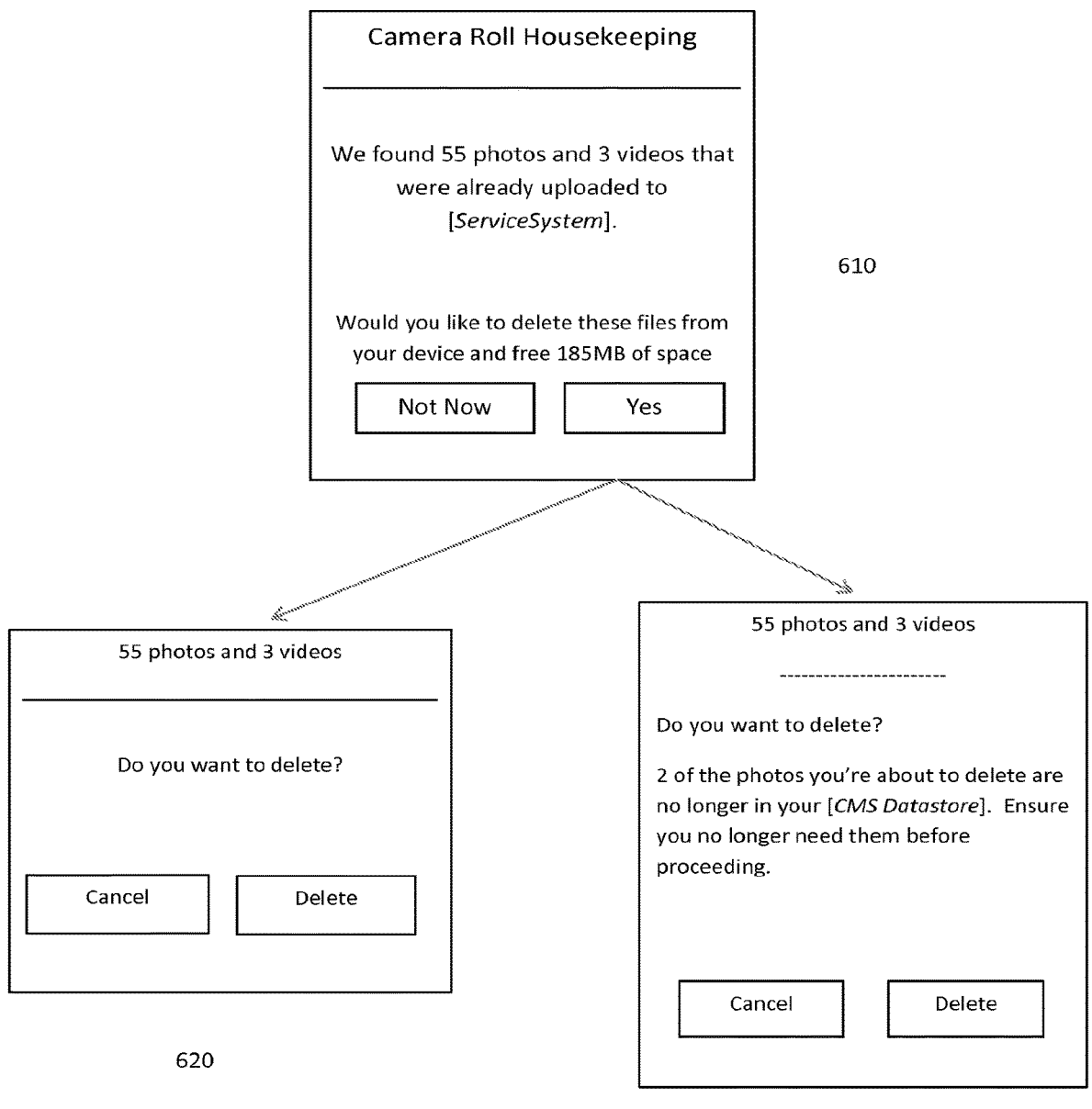

In the following description, for the purposes of explanation, numerous specific details are set forth in order to provide a thorough understanding of some embodiments of the present invention. It will be apparent, however, that some embodiments of the present invention may be practiced without these specific details. In other instances, some structures and devices are shown in block diagram form in order to avoid unnecessarily obscuring some embodiments of the present invention.

General Overview

Embodiments are provided for purging content items from a user device. Methods, systems, and computer readable media for a contact item purging functionality are provided. A contact item purger, such as may be incorporated within a local client application of a content management system, may leverage its knowledge as to what has been uploaded to the content management system by the user, and when to propose the deletion of content items that may safely be deleted locally so as to reclaim storage on the user device. A content item purger may run on one or more devices of a user associated with an account on a content management system, and may continually manage and propose to a user potential items for deletion, thus maintaining the available user device memory at all times.

Methods, systems, and computer readable media for content purging/space saving functionality on user devices are provided. Methods, systems, and computer readable media for a contact item purging functionality are provided. A contact item purger, such as may be incorporated within a local client application of a content management system leverages its knowledge as to what has been uploaded to the content management system, and when, to propose content items that may safely be deleted locally and thus reclaim storage on the user device. A contact item purger may run on one or more devices of a user associated with an account on a content management system, and may continually manage potential items to delete, thus maintaining the user device memory available at all times.

As noted, for purposes of description and simplicity, methods, systems and computer readable media will be described for a content storage and management service, and in particular, for a content item purger and processing technology for use in connection with such a content storage and management service. However, the terms "content storage service" and "content management system" are used herein to refer broadly to a variety of storage providers and management service providers as well as systems, services platforms and entities handling a wide variety of types of content, files, portions of files, and/or other types of data. Those with skill in the art will recognize that the methods, systems, and media described may be used for a variety of storage providers/services and types of content, files, portions of files, and/or other types of data.

It is noted that a content item may be any item that includes content accessible to a user of an electronic device.

The use of "content item" or "content items" is used herein to refer broadly to various file types. In some embodiments, content items may include digital photographs, documents, music, videos, folders, albums, playlists, collections, etc., or any other type of file, or any combination thereof, and should not be read to be limited to one specific type of content item. Moreover, the term "content item" may also refer to attributes associated with user files, including the file's metadata (e.g., filename, file size, etc.). In some embodiments content items may be stored in memory of an electronic device, on a content management system, on a social media network, or any other location, or any combination thereof.

Content Management System

FIG. 1 depicts an exemplary system for which a content item purging functionality may be provided in accordance with some embodiments of the invention. Elements in FIG. 1, including, but not limited to, first client electronic device 102a, second client electronic device 102b, and content management system 100, may communicate by sending and/or receiving data over network 106. Network 106 may be any network, combination of networks, or network devices that may carry data communication. For example, network 106 may be any one or any combination of LAN (local area network), WAN (wide area network), telephone network, wireless network, point-to point network, star network, token ring network, hub network, or any other configuration.

Network 106 may support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 may communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client electronic devices 102 may capture, record, and/or store content items, such as image files 110. Client electronic devices 102 may include camera 138 (e.g., 138a and 138b) to capture and record digital images and/or videos. For example, camera 138 may capture and record images and store metadata with the images. Metadata may include, but is not limited to, the following: creation time timestamp, geo-location, orientation, rotation, title, and/or any other attributes or data relevant to the captured image.

Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

Time normalization module 146 (e.g., 146a and 146b) may be used to normalize dates and times stored with a content item. Time normalization module 146, counterpart time normalization module 148, and/or any combination thereof may be used to normalize dates and times stored for content items. The normalized times and dates may be used to sort, group, perform comparisons, perform basic math, and/or cluster content items.

Organization module 136 (e.g., 136a and 136b) may be used to organize content items (e.g., image files) into clusters, organize content items to provide samplings of content items for display within user interfaces, and/or retrieve organized content items for presentation.

Organization module 136 may use any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

Content management application 114a and 114b (collectively 114), client application, and/or third-party application may be implemented to provide a user interface for a user to interact with content management system 100. Content management application 114 may expose the functionality provided with content management interface 104 and accessible modules for device 102. Web browser 116a and 116b (collectively 116) may be used to display a web page front end for a client application that may provide content management 100 functionality exposed/provided with content management interface 104. First client electronic device 102a may include classification module 150a. Second client electronic device 102b may include classification module 150b.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, classification module 152, and organization module 140. The content management service interface module 104 may expose the server-side or back end functionality/capabilities of content management system 100. For example, a counterpart user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 may interact with any number of other modules of content management system 100.

An account may be used to store content, such as documents, text files, audio files, video files, etc., from one or more client devices 102 authorized on the account. The content may also include folders of various types with different behaviors, or other mechanisms of grouping content items together. For example, an account may include a public folder that is accessible to any user. The public folder may be assigned a web-accessible address. A link to the web-accessible address may be used to access the contents of the public folder. In another example, an account may include a photos folder that is intended for photos and that provides specific attributes and actions tailored for photos; an audio folder that provides the ability to play back audio files and perform other audio related actions; or other special purpose folders. An account may also include shared folders or group folders that are linked with and available to multiple user accounts. The permissions for multiple users may be different for a shared folder.

Content items (e.g., files 110) may be stored in data store 118. Data store 118 may be a storage device, multiple storage devices, or a server. Alternatively, data store 118 may be cloud storage provider or network storage accessible via one or more communications networks. Content management system 100 may hide the complexity and details from client devices 102 by using a file system abstraction 128 (e.g., a file system database abstraction layer) so that client devices 102 do not need to know exactly where the content items are being stored by the content management system 100. Embodiments may store the content items in the same folder hierarchy as they appear on client device 102. Alternatively, content management system 100 may store the content items in various orders, arrangements, and/or hierarchies. Content management system 100 may store the content items in a network accessible storage (SAN) device, in a redundant array of inexpensive disks (RAID), etc. Content management system 100 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be stored in an object-oriented database, a relational database, a file system, or any other collection of data. In one variation, each content item stored in data store 118 may be assigned a system-wide unique identifier.

Data store 118 may decrease the amount of storage space required by identifying duplicate content items or duplicate chunks of content items. Instead of storing multiple copies, data store 118 may store a single copy of a file 134 ("file" as used in FIG. 1 being a generic term including various types of content items, and combinations thereof, in various data structures) and then use a pointer or other mechanism to link the duplicates to the single copy. Similarly, data store 118 may store files 134 more efficiently, as well as provide the ability to undo operations, by using a file version control that tracks changes to files, different versions of files (including diverging version trees), and a change history. The change history may include a set of changes that, when applied to the original file version, produce the changed file version.

Content management system 100 may be configured to support automatic synchronization of content from one or more client devices 102. The synchronization may be platform independent. That is, the content may be synchronized across multiple client devices 102 of varying type, capabilities, operating systems, etc. For example, client device 102*a* may include client software, which synchronizes, via synchronization module 122 at content management system 100, content in client device 102 file system 108 with the content in an associated user account. In some cases, the client software may synchronize any changes to content in a designated folder and its sub-folders, such as new, deleted, modified, copied, or moved files or folders. In one example of client software that integrates with an existing content management application, a user may manipulate content directly in a local folder, while a background process monitors the local folder for changes and synchronizes those changes to content management system 100. In some embodiments, a background process may identify content that has been updated at content management system 100 and synchronize those changes to the local folder. The client software may provide notifications of synchronization operations, and may provide indications of content statuses directly within the content management application. Sometimes client device 102 may not have a network connection available. In this scenario, the client software may monitor the linked folder for file changes and queue those changes for later synchronization to content management system 100 when a network connection is available. Similarly, a user may manually stop or pause synchronization with content management system 100.

A user may also view or manipulate content via a web interface generated and served by user interface module 104. For example, the user may navigate in a web browser to a web address provided by content management system 100. Changes or updates to content in the data store 118 made through the web interface, such as uploading a new version of a file, may be propagated back to other client devices 102 associated with the user's account. For example, multiple client devices 102, each with their own client software, may be associated with a single account and files in the account may be synchronized between each of the multiple client devices 102.

Content management system 100 may include sharing module 126 for managing sharing content and/or collections of content publicly or privately. Sharing module 126 may manage sharing independently or in conjunction with counterpart sharing module (e.g., 152*a* and 152*b*). Sharing content publicly may include making the content item and/or the collection accessible from any computing device in network communication with content management system 100. Sharing content privately may include linking a content item and/or a collection in data store 118 with two or more user accounts so that each user account has access to the content item. The sharing may be performed in a platform independent manner. That is, the content may be shared across multiple client devices 102 of varying type, capabilities, operating systems, etc. The content may also be shared across varying types of user accounts. In particular, the sharing module 126 may be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item file to a directory) the content item in another location within data storage in order to place the content item in the collection.

In some embodiments, content management system 100 may be configured to maintain a content directory or a database table/entity for content items where each entry or row identifies the location of each content item in data store 118. In some embodiments, a unique or a nearly unique content identifier may be stored for each content item stored in the data store 118.

Metadata may be stored for each content item. For example, metadata may include a content path that may be used to identify the content item. The content path may include the name of the content item and a folder hierarchy associated with the content item (e.g., the path for storage locally within a client device 102). In another example, the content path may include a folder or path of folders in which the content item is placed as well as the name of the content item. Content management system 100 may use the content path to present the content items in the appropriate folder hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator (URL), which allows any web browser to access the content in content management system 100 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be transmitted to content management system 100 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be transmitted to content management system 100 which may use the received content identification data to identify the appropriate content entry or database row and return the content item associated with the content entry or database row.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or false to indicate that a URL to the content item has not been created. Sharing module 126 may be configured to change the value of the flag to 1 or true after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This allows a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Sample User Interfaces

Next described are exemplary user interfaces, and various exemplary process flows, which may be implemented in an exemplary system such as is depicted in FIG. 1, to provide content item purging functionality.

FIGS. 2 through 6, next described, illustrate exemplary screenshots that may be provided to a user in accordance with exemplary embodiments of the present invention. These screenshots implement the goal of some embodiments of the present invention; namely, to provide a way to free space on a user device by automatically deleting content items, such as photos and videos, which have, for example, already been uploaded to a content management system.

The following scenarios represent exemplary use cases according to various exemplary embodiments of the present invention.

Scenario 1: A user goes hiking, returns home and runs a photo uploading program such as, for example, camera upload, on his or her user device. The next day, the same user returns to the trail and his or her user device is not connected to any network. After taking a few pictures the camera is nearly full, so it prompts the user to delete pictures from a previous day.

Scenario 2: The user has owned a smartphone for a year. It is full of pictures (which she has not yet deleted) and she is now low on space. She takes another picture and is prompted to clean up pictures stored on the smartphone that are older than 30 days.

Scenario 3: A user owns a relatively low-end, small device. After taking ten pictures it is full. An exemplary content management system application running on the device offers to delete them for the user once they have been uploaded.

In exemplary embodiments of the present invention, any photo, or any video, that was camera uploaded (or, for example, other content types, such as audio recordings, MP3 s, etc. that were uploaded) may be purged from the user device. If a useful amount of space may be reclaimed by such a purge, an exemplary application may display a notification to a user. This is shown, for example, in FIG. 2. With reference thereto, an exemplary application entitled "Camera Roll Housekeeping" notifies the user that the application has found 55 photos and 3 videos that were already uploaded to a content management system. It is noted that "Camera Roll" is a common application for storing photos on a smartphone, and thus, for illustrative purposes, the exemplary content purging application of FIGS. 2-6 is similarly named, it being understood that any photo/video or other content storing application may perform equivalent functionality in various embodiments.

For ease of illustration, the generic term ServiceSystem is utilized in FIGS. 2 through 6 to represent a generic content management system, and sometimes the actual datastore in that system is referred to generically as the CMS Datastore. Continuing with reference to FIG. 2, the notification asks the user if she would like to delete those files from her device and thereby free up 185 megabytes of storage space. Finally, the notification provides two active buttons for the user: one stating "No Thanks" and the other stating "Delete". If the user presses "Delete" the purge may begin. If "No Thanks" is chosen, logic may be implemented such that if after K such prompts, all of which result in a choice of "No Thanks" by the user, either (i) no further prompts are sent, or (ii) none are sent for a significant time period. Such a user may simply not be interested in automated or assisted purging, and need not be bothered.

In general, not every photo or video that has already been uploaded to an exemplary content management system needs to trigger a prompt to a user with a notification such as that illustrated in FIG. 2. In fact, as may be seen in FIG.

2, there needs to be a minimum useful amount of space that may be reclaimed or it may not be worth occupying the user's time with such notifications. Exemplary logic may therefore be, for example, as follows:

When DEVICE FREE SPACE is below X percent AND a content item purge will free up more than Y percent of storage (where Y>>>X−Z, and Z is the current free space on the device)

An exemplary application or functionality may offer to delete all pictures and/or videos that (i) have been previously uploaded to the content management system and that (ii) are older than, for example, 30 days. In addition, in some embodiments, the 30-day (or other "oldness" threshold, as may be chosen by a system, a user, or some combination) restriction may be broken (but not the "already uploaded" restriction) as much as is needed to meet a minimum amount of cleared space. For example, using the nomenclature of the exemplary logic presented above, if in order to free up Y percent of storage content items older than 15-29 days are required to be purged, then in some embodiments these content items may be purged, with or without a notification to the user as to the minimum age used for the purge. Using such exemplary logic, an exemplary application may only offer the content item purging feature via notification to a user, for example, where (i) the user is really low on space, (ii) is taking a picture, and where (iii) a meaningful amount of space may be freed up by performing the purge. In general, only material that is older than N days need be purged unless that is not sufficient to free up the space for the user. If it is insufficient, then the application may instead offer to delete whatever is needed in order to meet a sufficient amount of free space, as defined by a given application, system parameter and/or user configurable setting. In such case an application would seek to delete content items from oldest to newest, until a sufficient amount of space is reclaimed.

In exemplary embodiments of the present invention the scan may be optimized so as not to negatively impact battery or system performance. This may be done, for example, by checking available battery charge each time, and then deciding how aggressively to scan, using, for example, the following logic:

IF plugged in to power-→scan; ELSE IF battery charge above threshold J %-→scan; ELSE IF battery charge below threshold K %-→do not scan;

A sliding scale (e.g., only scan upon the occurrence of defined criteria) may be used for battery charge between K and J percentages. K may be set, for example, at 20, 15, 10 percent, or the like, as may be appropriate, depending upon the power draw for deleting content items on that device. Similarly, J may be set, for example at 50-70 percent. In this context it is noted that in many devices scanning and deleting a photograph or other content item may use a fraction of the power needed to take a photograph, for example, and thus in such devices will not really be a concern. Deleting is generally rather inexpensive battery/CPU/disk wise in most cases, inasmuch as in most systems a delete does not actually scrub the actual bits from storage or disk. It is noted, however, that there is a nuance on some devices in that deletes will necessitate a media scanner to re-index that file, but that is also very inexpensive in terms of power usage.

In exemplary embodiments of the present invention there may be various trigger conditions that cause the running of an exemplary content item purge application. For example, in some embodiments, whenever a user takes a photo or a video the application may check to see if space may be reclaimed. Alternatively, a trigger condition may be any time that device free space falls below X percent of the total, and a potential purge would free-up at least Y percent of space, as implemented by the example logic presented above. After such checking the user may be notified, for example as provided in FIG. 2, if the device free space is below X percent and more than Y percent of space may be freed up by the purge. If it is determined that a "useful" amount of space may in fact be recovered by purging photos, videos or other content items, in exemplary embodiments of the present invention such a notification may be issued alerting the user that N megabytes of space may be saved. Such an exemplary notification is that depicted in FIG. 2.

FIG. 3 presents an alternate user interface to that of FIG. 2 with a slight change in the active buttons. In this case the active buttons are "Not Now" and "Yes". With reference to FIG. 3, if the user clicks "Yes", or similarly with reference to FIG. 2 if the user clicks "Delete", a confirmation interface may be displayed such as is shown in FIG. 4. The notification of FIG. 4 repeats the number of photos and/or videos that were already uploaded to a content management system and repeats the question to the user as to whether he or she wishes to, in fact, delete them, for confirmation. If the user clicks the "Delete" active button then they may be deleted and the space saved or reclaimed. If the user presses "Cancel" then the notification of FIG. 2 or 3 may not be displayed again until the next triggering condition (e.g., taking a photo, some video, etc.).

Continuing with reference to FIG. 2, in exemplary embodiments of the present invention if the user clicks "No Thanks", an exemplary system need not again suggest to the user the opportunity to reclaim storage space until this space is freed (e.g., by the user on her own), and then once again filled up. At such time, if the user once again clicks "No Thanks", in some embodiments the prompt never need be provided to the user again. Alternatively, in other embodiments, a number of days may pass and the prompt may return in case the user changes their mind or decides they may wish to utilize the purging application.

In exemplary embodiments of the present invention, a separate notification to the user may be provided in the event that although some of the photos and/or videos were previously uploaded from the user device to a content management system or other data store, they are no longer there, i.e. they have been deleted from the data store of the content management system such that they are no longer available except perhaps on one or more local user devices. In this instance one may assume that the user may have intentionally decided that he or she no longer needs them and that is why they were deleted from the data store and the copy that is still stored locally is a remnant. Alternatively, the user may decide that she only needs the local copy on her smartphone, for example, and does not wish to delete that "last copy" for the time being. This is the situation depicted in FIG. 5. FIG. 5 is analogous to the confirmation interface of FIG. 4 which is displayed to a user who has clicked the "Delete" button in FIG. 2, or alternatively the "Yes" button in response to the notification of FIG. 3. In FIG. 5 the user is reminded that of the, for example, 55 videos and photos and 3 videos that may be deleted in a purge, two of the photos are no longer in the data store and so the user should be sure that he or she no longer needs them before proceeding. In similar fashion to FIG. 4, there are two possible responses displayed as active buttons: either "Cancel" or "Delete". If the user presses "Delete" all of the photos and videos—including the two that are no longer in the data store—will be deleted. In alternate embodiments, for example, a user may be offered the choice to keep the "last copy" items and delete the rest, or, for example, to first view a thumbnail of the "last copy items" prior to choosing a course of action.

Thus, FIGS. 3-5 present a collection of user interface flows that may be provided to a user in some embodiments of the present invention. These are presented synoptically in FIG. 6. Beginning at the top of FIG. 6, with screenshot 610 we see the familiar FIG. 3 notification to the user that a number of photos and videos that were already uploaded to a content management system were located. The user is further notified that should she like to delete these files from the device, 185 MB of space would be freed up. The user is provided with two active buttons, as noted above: "Not Now" and "Yes". If the user activates the "Not Now" button nothing further happens and process flow ends. Should the user, however, activate the "Yes" button, process flow moves to 620 where the user is displayed the confirmation user interface or notification. There, at the top of the exemplary display, the numbers of photos and videos that will be deleted are repeated, and the interface seeks confirmation to delete from the user. Again, there are two active buttons by which the user may signal his or her choice: "Cancel" and "Delete". If the user clicks "Cancel" nothing further happens and process flow ends, and in this instance the photos and videos are not deleted. If, on the other hand, the user activates the "Delete" button, the photos and videos as indicated are in fact deleted, the space is reclaimed on the user's device, and process flow ends. Alternatively, if at 610 the user activates the "Yes" button and, as noted above, some of the photos and/or the videos which were located by the exemplary application are no longer in the data store of the user's content management system, then a warning notification is included in the confirmation user interface 630. 630 is identical to 620 except for the following legend: "2 of the photos you're about to delete are no longer in your [CMS Datastore]. Ensure you no longer need them before proceeding."

In similar fashion to the options available in 620 and in FIG. 4, there is "Cancel" and "Delete." If the user activates the "Cancel" button no deletions occur and process flow ends. If, on the other hand, the user activates the "Delete" button at 630 then the 55 photos and 3 videos are in fact deleted, even though some of them are no longer in the data store of the content management system. Thus, the user loses the local copies of those photos and/or videos but at the same time reclaims the space as represented to him or her in the initial notification at 630.

Exemplary Process Flows

Figure 7:
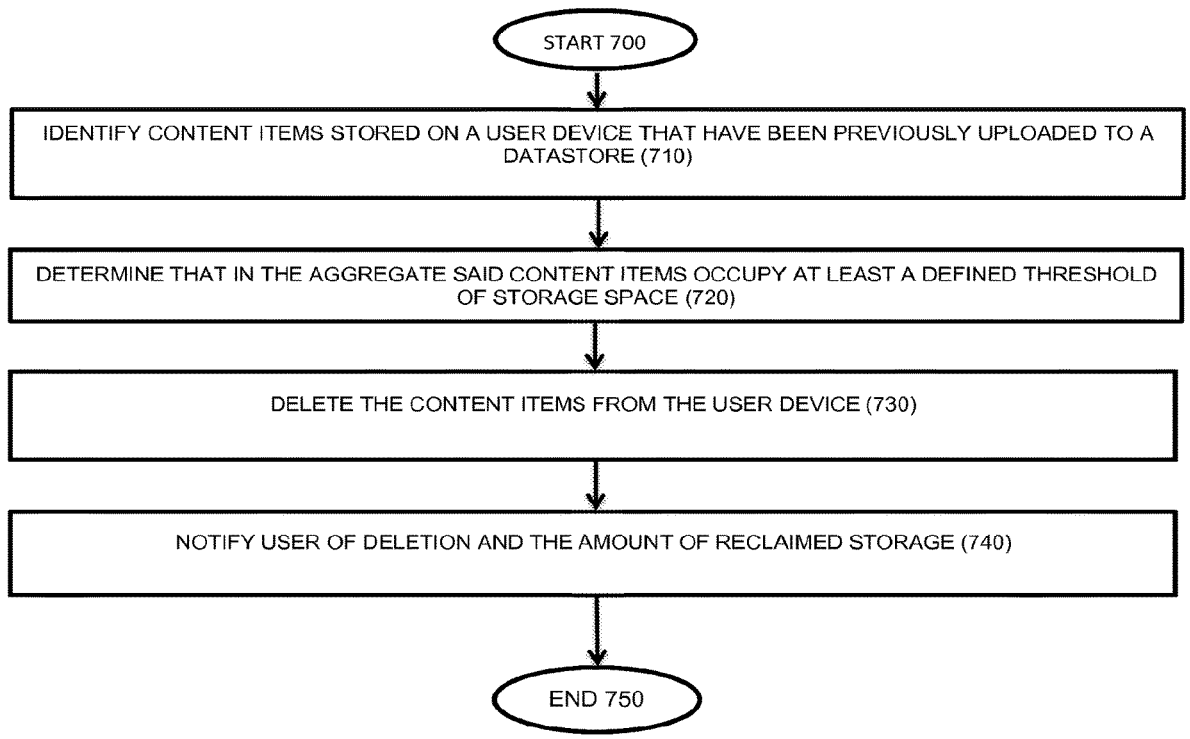
FIG. 7 is an exemplary process flow diagram for an illustrative basic content item purger in accordance with some embodiments of the invention.
Figure 8:
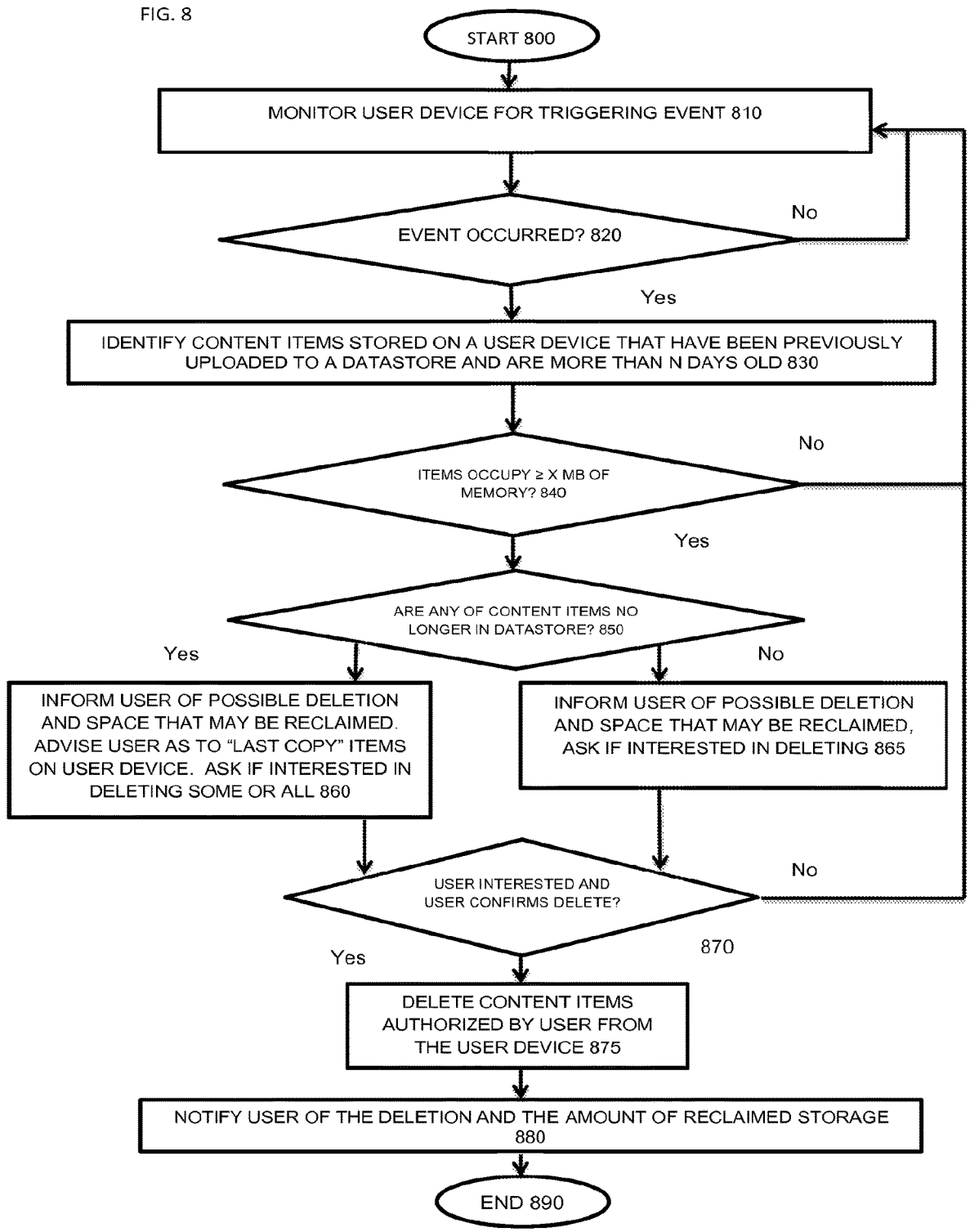
FIG. 8 is an exemplary process flow diagram for a more detailed illustrative content item purger in accordance with some embodiments of the invention.
Figure 9:
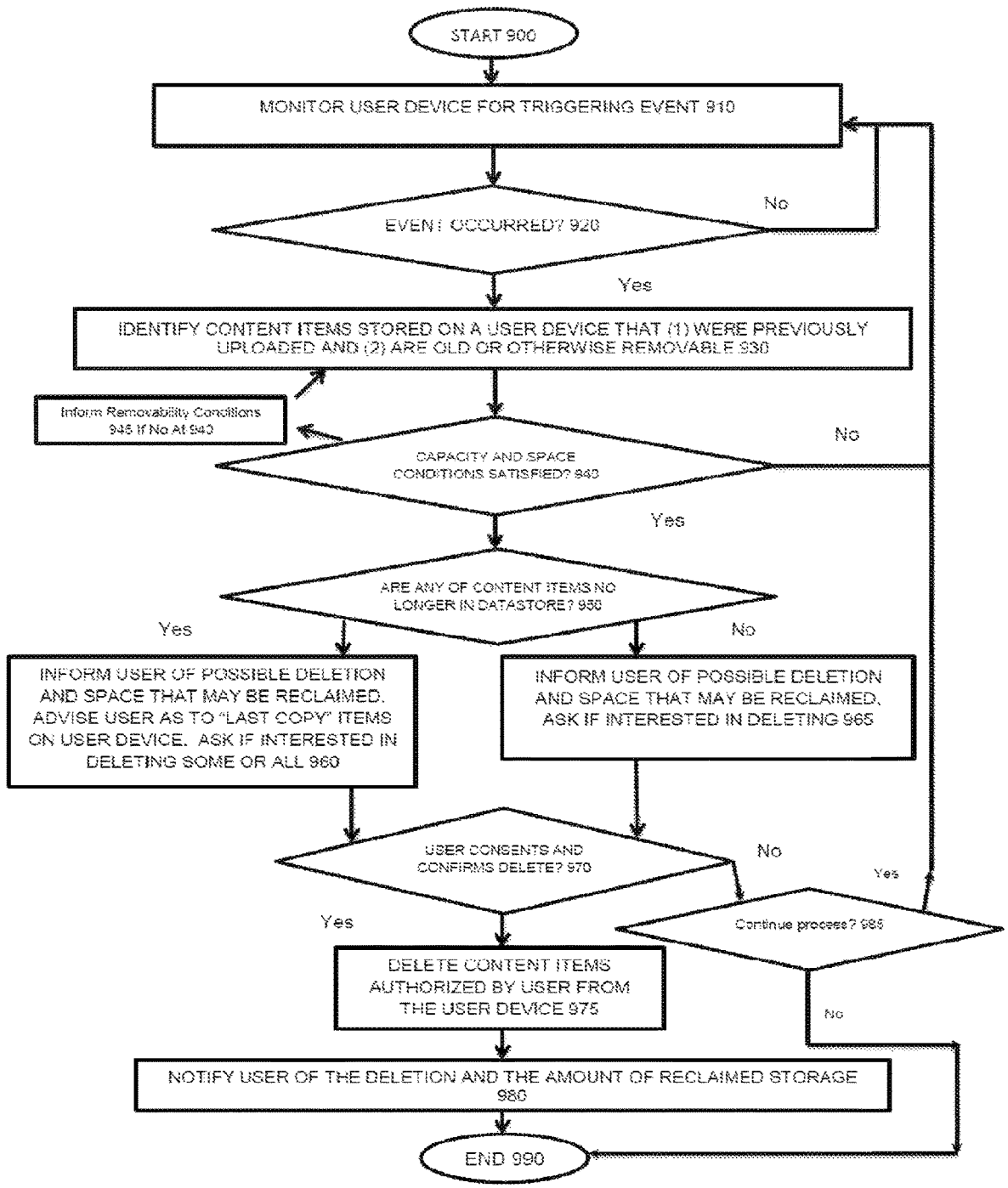
FIG. 9 is an exemplary process flow diagram for still another detailed illustrative content item purger in accordance with some embodiments of the invention.

Next described with reference to FIGS. 7-9 are exemplary process flows according to exemplary embodiments of the present invention. As seen above with reference to FIGS. 2-6, there are various thresholds and variables that may be defined by a system, by a user, or by a combination of both, in exemplary embodiments of the present invention. These parameters may control, for example, when a user is advised of a potential content item purge, and what the notification may look like. Thus, any process flow presented below is understood to be solely exemplary, given that further conditions may be added or removed as may be desired in various contexts. Having noted that, FIG. 7 depicts a basic process flow according to some embodiments. FIG. 8 is a more detailed process flow, with various conditions controlling the flow. Finally, FIG. 9 is even more detailed, and illustrates various conditions and parameterizations that are possible. A variety of other process flows similar to that depicted in FIG. 9 are also possible upon instantiation of specific conditions, as noted below.

With reference to FIG. 7, process flow begins at Start 700. From Start, process flow moves to 710 where an exemplary system may identify content items stored on a user device that have been previously uploaded to a data store. Such a data store may be, or be within, for example, a content management system. Such exemplary content items may be of various types, as noted above, such as, for example, photos, videos, files, audio files such as mp3, or the like. Common to all of these examples is the fact that a user's device, for example a smartphone, has a fixed memory capacity, as described above, and additional content items cannot be added to that memory once it reaches this capacity. A client process running on the user's device may determine if the user has uploaded to his or her account one or more content items. Such a process may be, for example, a client of a content management system, or some other application.

Continuing with reference to FIG. 7, process flow then moves to 720, where a determination may be made as to whether the content items identified at 710 are, in the aggregate, sufficiently many in number or in size so as to occupy at least a defined threshold of storage space. If, in the aggregate, the items identified by the exemplary process of FIG. 7 are in excess of such a defined threshold, then it pays to alert the user that significant storage space on the user device may be reclaimed. If the aggregate of said content items is miniscule, it is not worth taking up the user's time with a process that will effectively not yield much benefit. The defined threshold in exemplary embodiments of the present invention may be expressed as, for example, a fixed number of megabytes of storage, such as for example 100 MB or 500 MB, or, for example, the threshold may be a percentage of the overall storage space located on the device. Alternatively, the threshold may be dynamic, and may be lowered the closer a user comes to being at full memory capacity. From 720 process flow moves to 730, where the identified content items may be deleted from the user device. In this exemplary process flow there is no condition imposed of presenting the option to the user and seeking the user's consent. This is a basic process flow and in various exemplary embodiments may be pre-programmed by a user to periodically identify when a significant set of content items is redundant both on the local device and on a content management system and simply clean up the space without even bothering the user. In other exemplary embodiments, such as those whose process flow is similar to or as is depicted in FIG. 8, as well as those depicted above with reference to FIGS. 2-6, a user may always be prompted as to whether or not he or she desires to have the identified content items deleted and space reclaimed, and, for example, if the user signals such consent, a further prompt may be sent to the user, asking that he or she confirm the deletion. The prompt may list the aggregate number of content items and the corresponding space savings, such as is shown in FIG. 3, or alternatively the prompts may be more detailed, especially as in the case of FIG. 5, where the photos that are "last copies" may be identified in some way (e.g., thumbs) so that the user truly is aware that a "last copy" may be about to be deleted.

From 730 process flow moves to 740, where the user is notified about the deletion and the amount of reclaimed storage as a result. This is an optional step in the context of the process flow of FIG. 7 where, as noted above, a user may simply desire for this processing to happen in the background and need not be advised when sufficient storage has been reclaimed. However, in other exemplary embodiments it may be useful to be made aware when a significant bulk of memory has been reclaimed, especially if the user has a particular use in mind such as, for example, recording lectures or conversations, or taking a large number of photos or long videos. From 740 process flow moves to 750, where it ends.

FIG. 8 depicts an alternate exemplary process flow according to some embodiments of the present invention. With reference thereto, process flows begins at Start 800, and then moves to 810 where a user device may be monitored for a triggering event so as to launch a content item purge functionality. It is noted that this process preferably runs in the background on a user device, and thus does not require the user to actually open a client on the user device, such as, for example, a content management system application. In contexts when access to a user device is less readily available, exemplary content item purging can run whenever the client software is open on the device, and/or triggered when a user interacts with content items via the client software, for example.

Continuing with reference to 810, a triggering event may be, for example, a regularly scheduled task, such as checking for potential purges every three weeks, or every two weeks, or a dynamic interval, depending upon the rate at which a user fills the memory on their local device. This parameter may be set by a user, by a system, or by some combination of both, such as, for example, a default system setting but one which a user may alter, depending upon their use of memory, or which the system itself may alter dynamically, based on memory capacity measurements. Or, for example, in either case, based on (i) user usage of content item acquisition (e.g., taking of photographs, recording of audio, etc.) and (ii) memory capacity available. Alternatively, a triggering event may be the user taking photographs or video, or invoking a recording functionality on the device such as, for example, may be done by a university student who regularly records her lectures. Recording lectures in a number of classes may quickly eat up lots of memory, especially if a high resolution or lossless format is used (e.g. ".wav") and the classes are an hour or more in length. As another example, a triggering event may be the memory on the user's device having reached some percentage of capacity. The precise percentage may be, for example, 90%, or 95%, and again may be set as a default, subject to modification by the user, or may be allowed to vary dynamically.

If a potential triggering event is detected at 810, process flow may move to 820 where it is queried as to whether the triggering event has occurred. If no, process flow returns to 810 and the device continues to monitor for a triggering event.

If a triggering event has in fact occurred, as determined at 820, process flow moves to 830 where, similarly to the process of FIG. 7, content items may be identified that have (1) been stored on the user device for more than N days, and also (2) have been previously uploaded to a data store. This is an example of a further condition on the basic process flow of FIG. 7, where it is not enough to simply identify content items that have already been uploaded to a data store, and that thus the locally stored items are duplicate content items for that user, but rather that the duplicates are not seen to be worth removing unless they are in some sense "old" and thus not necessary to have on the user device. In some embodiments, "old" may be defined by a system parameter, or by a user, or by a combination of both, to be some number of days. For example, 30 days may be considered to be "old" in the realm of a user who frequently takes pictures and has been known to fill her memory on multiple occasions. Or, for other people, N days may be set at 7 days, as in the case of the college student uploading multiple recordings of lectures she attends. Various possible definitions, both static and dynamic, are possible.

It is noted that the "old" parameter may be dynamic, and a function of other parameters, such as, for example, memory capacity used. If memory capacity is at, say 96%, what is considered "old" may significantly change, as it is necessary to have some memory space cleared rather urgently. In some embodiments intelligence may be provided to dynamically set the N days of oldness parameter as a function of both memory capacity used and total memory potentially reclaimed. Thus, N may be chosen so as to be small enough to achieve a significant freeing up of memory, subject to a minimum age of say, 5 days, for example.

Returning to FIG. 8, given that a number of content items have been identified at 830 to have met the condition of being "old" by simply being on the user device for at least N days—as that parameter is then dynamically defined—process flow may move to 840, where a test is performed to determine whether a sufficient amount of memory is occupied by these items to justify a purge. This is similar to the test of FIG. 7 at 720, where it is queried whether, in the aggregate, the content items identified for potential deletion occupy at least a defined minimum threshold of storage space. Here the storage space threshold is expressed in number of megabytes X occupied by the identified content items, which again may be a system parameter. Alternatively, instead of defining the threshold in terms of megabytes of memory, it could be a percentage of overall memory capacity, as noted above in the discussion of FIGS. 2-6.

As noted, a triggering event such as is indicated at 810 and 820 may also be the user device being within Y percent of its overall memory capacity. For example, if the user has filled 95% or more of the available storage space, the user is really in a critical condition and a purge of content should be performed. Otherwise he or she will quickly run out of memory. When a user device is close to being full and its memory saturated, the notion of age or "old" may become quite short in terms of days N, and the minimum threshold of X megabytes that may be reclaimed may also become quite small. Alternatively, if the triggering event is not the user device being near full memory capacity, but rather other criteria such as taking a photo, recording audio, or a periodically scheduled offer to purge content, the parameters N days of aging and X megabytes of potentially reclaimed memory may be set longer and higher, respectively, as the case may be. In a general sense, all of these parameters may be understood as "capacity and space conditions", as described below with reference to FIG. 9.

Returning now to 840, if the content items identified do in fact occupy greater than X megabytes of memory, then process flow may move to 850 for further testing. If they do not, then process flow may move back to 810 where the user device is once again monitored for a triggering event. Continuing with 850, where the items do occupy sufficient storage space to make a purge worthwhile, it may be determined whether any of the content items are no longer in the user's data store at 850. This is important because although they were once uploaded to her data store, the items on the local user device may now be the last copy available to this user given that she may have deleted those uploaded items from the data store at some time subsequent to uploading them. If this is the case, either (i) the user does not care about them—in which case she may not mind at all removing them from the local device—or (ii) she may have decided to "clean house" at the data store in reliance upon having a local copy on her smart phone, for example.

Therefore, process flow will bifurcate at 850 depending upon the answer to the determination. If yes at 850, then process flow moves to 860 where the user may be informed of possible deletion of content items and space to be reclaimed as result, in a similar notification to that shown in FIG. 5. As well, the user may be advised as to which items in particular on her device are "last copy" items, i.e., items which were once uploaded to the data store but are no longer present in the data store, and asked if she is interested deleting some or all of the identified content items. In general, a user will, if interested in purging memory space, freely delete items which are on the data store and may delete items which are no longer in the data store. If at 860 the user confirms a desire to delete some or all of the available content items, then process flow may move to 870, where the exemplary system confirms that the user is interested in the deletion. Alternatively, and apposite to FIG. 5, following an initial query such as that of FIG. 2 or 3, it may be only first brought to the user's attention in the delete confirmation notification that some of the content items are "last copies".

Returning now to 850, where, if the answer to the determination is no, that means that no items tagged for potential deletion are actually last copies, then the user is informed of the possible deletion and the space that may be reclaimed as a result, and is asked, as is shown in FIG. 2, if he or she is interested in deleting those items at 865. Process flow moves to 870 where it is then determined if (i) the user is in fact interested and (ii) whether the user confirms the deletion (as shown in FIGS. 3 and 4, respectively). If she responds yes to both, process flow may move to 875 where the content items authorized by the user are deleted from the user's device. From there process flow may move to 880 where the user is notified of the deletion and the amount of reclaimed storage, and process flow ends at 890.

FIG. 9 is a similar process flow to that of FIG. 8, with some important exceptions. In similar fashion as described for FIG. 8, process flow begins at 900 and determines at 920 if a triggering event for the content item purge process has occurred. If no, process flow returns to 910. However, if yes, then at 930 content items are identified that (1) were previously uploaded, and (2) are "old or otherwise removable." This latter condition is an extension of the "oldness" idea of FIG. 8, where besides merely being old, an item may be designated as removable for various other reasons. This may include a better copy being already on the data store, albeit not one uploaded from the smartphone, for example. Or, for example, a better copy having been shared with the user on the content management system, and thus fully available to the user. Such considerations may even break the "previously uploaded" condition in some embodiments. Moreover, the removability conditions are dynamic, as next noted.

At 940 the current capacity of the memory (justifying a purge) and the size of memory occupied by the identified items may be analyzed. If the latter is small, but capacity is near full, although the condition is not satisfied, flow returns to 910 and removability conditions are informed at step 945, so that they may be dynamically modified. Such modification may make more content items (usually newer ones) eligible for removal, and thus the next time the process runs (which may be immediately, if being near memory capacity is a triggering event) more items may be designated as removable. This illustrates dynamically modifying items eligible for removal in response to then current memory conditions, which may be implemented in some embodiments.

Flow through 940, 950, 960 and 965, 970, 975, and 980 are essentially identical to that of the analogous steps of FIG. 8, and thus will not be repeated. However, at 970, if the user does not confirm the deletion, instead of process flow returning to 910, a test may be performed at 985 as to whether to continue. This covers the situation where a user has repeatedly declined to perform any deletions. If so, exemplary logic may preclude further prompts of the content item purging service, and process flow ends at 990.

General Considerations and Extensions

In general, various embodiments of the present invention allow a user to keep content items on a device for a minimum amount of time. Moreover, if there is ample memory space on the device there is no concern to delete anything. However, if the user took, for example, a whole bunch of pictures yesterday, the idea is to free memory space after they have been removed in the event the device is running out of space. If the user took a bunch of pictures from, say, two months ago but still has plenty of space, there is no need to even ask the user.

In some embodiments, a triggering event may simply be defined as the downloading of a large file or files in general, so that if a user downloads such a big file or files, space may be freed up by purging content items. Thus, for example, a user may repeatedly download content items to a download folder and they may end up with a lot of junk in there. An exemplary application may transfer those content items to a remote data store, have it available, saved and bookmarked, and then delete the contents of the download folder to reclaim space.

As noted, a memory or storage capacity threshold on a device may be determined by the device's free space. When low on space, say less than 10% free space, in some embodiments there may be a sliding window where content items may be aggressively deleted that are older than, say, even 12 hours. Otherwise, in other embodiments, the rule may be to delete photos older than, say, 30 days. If a useful amount of space, expressed as some percentage of the device's storage capacity, (e.g., 1%, 2%, 5%, etc.) may be claimed, a notification may be displayed to the user.

Additionally, in alternate embodiments, content items need not be explicitly stored on the content management system from the user device. Rather, content items may be purged from the user device as long as a copy exists on the content management system, or even, in some embodiments, if a similar image or content item is stored on the content management system. Such similarity may be determined using various criteria, methods and embodiments as are known, such as, for example, those disclosed in U.S. Utility patent application Ser. No. 13/888,082, filed on May 6, 2013, entitled "Duplicate/Near Duplicate Detection and Image Registration", the disclosure of which is hereby incorporated by reference in its entirety.

As an interesting extension, in some embodiments, as a user takes photographs, when they are uploaded to a content management system they may be replaced on the local user device with a downsampled, or truncated version. So, following such a process, there may be a different view than the native view stored locally, and the native view would be replaced with smaller copies of the same photos. This is not a true purge, but rather a "shrinkage", and may be used to save space in some embodiments if removability conditions do not allow a purge, for example. Thus, for example, this alternative reduces the amount of space that was taken on the user device by the content item(s), instead of entirely getting rid of them. In some embodiments a default setting may be to do this with, for example, every photograph taken, thus obviating the need for true purges.

Thus, in such alternate embodiments, when a user takes pictures (or otherwise acquires content items), the exemplary application would store the full-size content item until it can be moved to the content management system servers. Subsequently, when the user opens the photo (or other content item), she may be shown a high-quality preview, and then, if she really wants to, she may retrieve the full size content item on her phone from the content management system, for example.

In some embodiments a triggering event may be a request by a user. One way this may be done is that the user goes into his outbox after being prompted inside an exemplary application.

In a related extension of the various processes described above, attachments to emails may also be purged to reclaim space on a user device. Thus, for example, a user's sibling may send family photos that take up a large amount of space in the user's email account, and the user thus needs to (or may be ordered to) free up space within the email client. These photos may be uploaded to a content management system and then removed from the user's email account so that they are no longer occupying storage space. This extension is effectively a version of email archiving via a content management system.

Thus, in general, by leveraging an exemplary local application's ability to upload to a content management system, various content items of a wide variety of types may be archived on the content management system, and either purged, or stored in a much smaller "preview", "thumb" or otherwise truncated form, on the user device.

Exemplary Implementations

Any suitable programming language may be used to implement the routines of particular embodiments of the present invention, including, but not limited to, the following: C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general-purpose digital computer, by using application specific integrated circuits, programmable logic devices, field programmable gate arrays, optical, chemical, biological, quantum or nano-engineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings or figures may also be implemented in a more separated or integrated manner, or even removed or rendered as inoperable in certain cases, as is useful in accordance with a particular application. It is also understood to be within the spirit and scope of the present invention to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for contact importing and processing, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

The invention claimed is:

1. A method for reclaiming storage space at a computing device, the method comprising:
    storing, by a content management system application installed on the computing device, attributes at the computing device for tracking upload status of a set of content items locally stored within a file system of the computing device, the set of content items under management of a content management system and monitored by the content management system application;
    based, at least in part, on the attributes for tracking upload status of the set of content items, identifying, by the content management system application, a plurality of content items, of the set of content items, that have all been previously uploaded to a datastore of the content management system and therefore exist at a same time on both the file system of the computing device and the datastore of the content management system, the set of content items identified based on metadata indicating prior upload to the datastore; and
    based, at least in part, on determining that the plurality of content items, in aggregate, occupy an amount of storage space in the file system exceeding a storage threshold amount and that each content item, of the plurality of content items, is stored in the file system for at least a time threshold, wherein the plurality of content items and exist on both the computing device and the datastore of the content management system, reclaiming, by the content management system application, storage space in the file system occupied by the plurality of content items.

2. The method of claim 1, wherein reclaiming storage space in the file system occupied by the plurality of content items is based, at least in part, on deleting one or more content items, of the plurality of content items, from the file system.

3. The method of claim 1, wherein reclaiming storage space in the file system occupied by the plurality of content items is based, at least in part, on storing, in the file system, a truncated version of a respective content item of the plurality of content items.

4. The method of claim 1, wherein reclaiming storage space in the file system occupied by the plurality of content items is based, at least in part, on storing, in the file system, a downsampled version of a respective content item of the plurality of content items.

5. The method of claim 1, further comprising:
determining an aggregate storage space based, at least in part, on a sum of a corresponding size in the file system of the plurality of content items; and
based, at least in part, on determining that the aggregate storage space exceeds the storage threshold amount, performing the reclaiming storage space in the file system occupied by the plurality of content items.

6. The method of claim 1, further comprising, based, at least in part, on receiving user input confirming reclamation of storage space in the file system, performing the reclaiming storage space in the file system occupied by the plurality of content items.

7. The method of claim 1, further comprising, based, at least in part, on determining that the computing device is operating on battery power and that a charge level of a battery of the computing device is above a threshold charge level, performing the identifying the plurality of content items, of the set of content items, that have all been previously uploaded to the datastore of the content management system.

8. The method of claim 1, further comprising, based, at least in part, on determining that the computing device is operating on alternating current power, performing the identifying the plurality of content items, of the set of content items, that have all been previously uploaded to the datastore of the content management system.

9. The method of claim 1, further comprising, based, at least in part, on determining that an amount of available storage space in the file system is below a threshold amount, performing the identifying the plurality of content items, of the set of content items, that have all been previously uploaded to the datastore of the content management system.

10. A non-transitory computer-readable medium comprising memory with instructions stored thereon for reclaiming storage space at a computing device, the instructions, when executed by one or more processors, causing the one or more processors to perform operations comprising:
storing, by a content management system application installed on the computing device, attributes at the computing device for tracking upload status of a set of content items locally stored within a file system of the computing device, the set of content items under management of a content management system and monitored by the content management system application;
based, at least in part, on the attributes for tracking upload status of the set of content items, identifying, by the content management system application, a plurality of content items, of the set of content items, that have all been previously uploaded to a datastore of the content management system and therefore exist at a same time on both the file system of the computing device and the datastore of the content management system, the set of content items identified based on metadata indicating prior upload to the datastore;
determining an aggregate storage space based on a sum of a corresponding size in the file system of the plurality of content items; and
based, at least in part, on determining that the aggregate storage space occupies an amount of storage space in the file system exceeding a threshold amount and that the plurality of content items exist on both the computing device and the datastore of the content management system, reclaiming, by the content management system application, storage space in the file system occupied by the plurality of content items.

11. The non-transitory computer-readable medium of claim 10, wherein reclaiming storage space in the file system occupied by the plurality of content items is based, at least in part, on deleting one or more content items, of the plurality of content items, from the file system.

12. The non-transitory computer-readable medium of claim 10, wherein reclaiming storage space in the file system occupied by the plurality of content items is based, at least in part, on storing, in the file system, a truncated version of a respective content item of the plurality of content items.

13. The non-transitory computer-readable medium of claim 10, wherein reclaiming storage space in the file system occupied by the plurality of content items is based, at least in part, on storing, in the file system, a downsampled version of a respective content item of the plurality of content items.

14. The non-transitory computer-readable medium of claim 10, further comprising: based, at least in part, on determining that each content item, of the plurality of content items, is stored in the file system for at least a threshold amount of time, performing the reclaiming storage space in the file system occupied by the plurality of content items.

15. The non-transitory computer-readable medium of claim 10, further comprising, based, at least in part, on receiving user input confirming reclamation of storage space in the file system, performing the reclaiming storage space in the file system occupied by the plurality of content items.

16. A system comprising:
memory with instructions encoded thereon for reclaiming storage space at a computing device; and one or more processors that, when executing the instructions, cause the system to perform operations comprising:
storing, by a content management system application installed on the computing device, attributes at the computing device for tracking upload status of a set of content items locally stored within a file system of the computing device, the set of content items under management of a content management system and monitored by the content management system application;
based, at least in part, on the attributes for tracking upload status of the set of content items, identifying, by the content management system application, a plurality of content items, of the set of content items, that have all been previously uploaded to a datastore of the content management system and therefore exist at a same time on both the file system of the computing device and the datastore of the content management system, the set of content items identified based on metadata indicating prior upload to the datastore;
determining an aggregate storage space based on a sum of a corresponding size in the file system of the plurality of content items; and
based, at least in part, on determining that the aggregate storage space occupies an amount of storage space in the file system exceeding a threshold amount and that the plurality of content items exist on both the computing device and the datastore of the content management system, reclaiming, by the content management system application, storage space in the file system occupied by the plurality of content items.

17. The system of claim 16, wherein reclaiming storage space in the file system occupied by the plurality of content items is based, at least in part, on deleting one or more content items, of the plurality of content items, from the file system.

18. The system of claim 16, wherein reclaiming storage space in the file system occupied by the plurality of content items is based, at least in part, on storing, in the file system, a truncated version of a respective content item of the plurality of content items.

* * * * *